United States Patent
Foxx-Gruensteidl (10) Patent No.: US 11,460,333 B2
(45) Date of Patent: Oct. 4, 2022

(54) CONTAINER MANAGEMENT DEVICE

(71) Applicant: United States Postal Service, Washington, DC (US)

(72) Inventor: Manfred Foxx-Gruensteidl, Amissville, VA (US)

(73) Assignee: UNITED STATES POSTAL SERVICE, Washington, DC (US)

(*) Notice: Subject to any disclaimer, the term of this patent is extended or adjusted under 35 U.S.C. 154(b) by 22 days.

(21) Appl. No.: 17/082,154

(22) Filed: Oct. 28, 2020

(65) Prior Publication Data
US 2021/0131851 A1    May 6, 2021

Related U.S. Application Data (60) Provisional application No. 62/928,729, filed on Oct. 31, 2019.

(51) Int. Cl.
*G01F 17/00* (2006.01)
*G01B 11/22* (2006.01)
*G01F 25/00* (2022.01)

(52) U.S. Cl.
CPC .............. *G01F 17/00* (2013.01); *G01B 11/22* (2013.01); *G01F 25/0092* (2013.01)

(58) Field of Classification Search
CPC .. B01F 33/8442; B01F 31/60; B01F 2101/21; B01F 35/717611; B01F 35/2115; B01F 35/2131; B01F 35/2209; B01F 21/20; B01F 33/841; B01F 35/714; B01F 33/84; B01F 33/844; G01B 11/24; G01B 7/18;
(Continued)

(56) References Cited

U.S. PATENT DOCUMENTS 8,109,301 B1 * 2/2012 Denise .................... G07F 9/023
                                                      141/360
10,577,180 B1 * 3/2020 Mehta ..................... B25J 9/162
10,894,664 B1 * 1/2021 Brady ................... B65G 1/1378
(Continued)

FOREIGN PATENT DOCUMENTS

CN        203450460 U  *  2/2014
CN        108025899 A  *  5/2018  .......... G05B 19/042
(Continued)

*Primary Examiner* — Michael P Stafira
(74) *Attorney, Agent, or Firm* — MH2 Technology Law Group, LLP (57) ABSTRACT

A system for processing delivery items, the system including a delivery item monitoring device comprising one or more sensor and a processor that is communicatively connected to the delivery item monitoring device and that is configured to perform operations comprising obtaining sensor data from the one or more sensor. The operations can also include calculating a depth of the received delivery items in the container based on the sensor data and generating an under-filled indicator, a transport indicator, or an over-filled indicator based on the depth of the received delivery items in the container. Furthermore, the operations can include transmitting the under-filled indicator, the transport indicator, or the over-filled indicator to a control system, wherein the under-filled indicator, the transport indicator, and the over-filled indicator designate how to process the container to the control system.

20 Claims, 6 Drawing Sheets

(58) Field of Classification Search
CPC ......... G01B 11/02; G01B 11/08; G01B 11/10; G01B 11/0608; G01B 11/22
See application file for complete search history.

(56) References Cited

U.S. PATENT DOCUMENTS

| | | | | |
|---|---|---|---|---|
| 2008/0092488 | A1* | 4/2008 | Gabrielsen | B65B 55/20 53/428 |
| 2013/0081737 | A1* | 4/2013 | Bassani | B65B 1/46 141/283 |
| 2018/0224150 | A1* | 8/2018 | Lewis | G01K 1/024 |
| 2019/0062137 | A1* | 2/2019 | Schick | G06T 7/62 |

FOREIGN PATENT DOCUMENTS

| | | | | | |
|---|---|---|---|---|---|
| EP | | 2993448 | A1 * | 3/2016 | ........... G01F 23/292 |
| EP | | 3275348 | A1 * | 1/2018 | ........... A47J 31/4482 |
| WO | WO-0166416 | A1 * | 9/2001 | ............. B65B 39/12 |
| WO | WO-2010076026 | A1 * | 7/2010 | ............. B65B 55/20 |
| WO | WO-2018232749 | A1 * | 12/2018 | ............. A47J 31/44 |
| WO | WO-2020251362 | A1 * | 12/2020 | ........... G06Q 10/087 |

\* cited by examiner

CONTAINER MANAGEMENT DEVICE

CROSS-REFERENCE TO RELATED APPLICATIONS

This application claims the benefit of and priority to U.S. Provisional Patent Application No. 62/928,729, filed on 31 Oct. 2019, which is hereby incorporated by reference in its entirety.

BACKGROUND

Various agencies and companies provide parcel delivery services, such as the U.S. Postal Service, the Federal Express corporation (FedEx™), and the United Parcel Service corporation (UPS™). Often, the parcels that are delivered are containers composed of paper, cardboard, wood, etc., which enclose any number of items or goods that are being sent and delivered. In some examples, parcels can be or include magazines, catalogs, and the like, which are sent and delivered without being in a container.

Generally, the delivery items or goods can be different sizes. Accordingly, filling a container with delivery items or goods can involve determining the size of each item or good, as well as determining the number of items or goods that are, or can be, placed in the container. In some examples, the container can store any number of delivery items or goods that can satisfactorily fit within a predetermined distance from the top of the container. For example, the container may include or contain any number of delivery items or goods that fill the container up to within one inch, half of one inch, or any other suitable measurement, from the top of the container. When the container is filled to a satisfactory level, the container can be moved or routed within a delivery system to process, sort, and/or distribute the delivery items or goods.

Exceeding the capacity of the container by placing too many delivery items or goods in the container can cause maintenance and sorting issues when the overfilled container is sent through a delivery system, for example, an overfilled container may be too heavy to be safely handled by the sorting equipment and personnel, may spill its contents, and may cause equipment breakage or excessive wear. Additionally, under-filling a container with fewer delivery items or goods that can satisfactorily fit and be processed can cause the delivery system to be inefficient and require additional containers and/or trips for containers through the delivery system to distribute and deliver the delivery items or goods, which increases costs and the time needed to process, sort, distribute, and deliver a given number of delivery items.

Accordingly, there is a desire for systems and devices that can accurately detect a satisfactory number, quantity, height, or the like of delivery items within a container, prior to processing the container in a delivery system.

SUMMARY

Various aspects of the present disclosure describe a delivery item monitoring device for managing the containers of a transport system. In some examples, a system can include a delivery item monitoring device comprising one or more sensors, wherein the delivery item monitoring device is positioned above a container that is receiving delivery items and the one or more sensors detect a distance between the one or more sensors and at least one of the delivery items. The system can also include a processor that is communicatively connected to the delivery item monitoring device and that is configured to execute computer-readable instructions that cause the processor to perform operations including obtaining sensor data from the one or more sensors. The operations can also include calculating a depth of the received delivery items in the container based on the sensor data, and generating an under-filled indicator, a transport indicator, or an over-filled indicator based on the depth of the received delivery items in the container. Furthermore, the operations can include transmitting the under-filled indicator, the transport indicator, or the over-filled indicator to a control system, wherein the under-filled indicator, the transport indicator, and the over-filled indicator designate how to process the container to the control system.

In some examples, the one or more sensors include one or more distance-measuring sensors. In some examples, the one or more distance-measuring sensors include a camera, a laser range finder, an infrared range finder, an ultrasonic range finder, or a combination thereof.

In some embodiments, the one or more sensors further include an accelerometer, a location sensor, or a combination thereof. In some examples, the one or more sensors include a plurality of distance-measuring sensors, and calculating the depth further comprises calculating the depth of the received delivery items based on an average of a plurality of distance values detected by the plurality of distance-measuring sensors. The plurality of distance values can correspond to distance values between each of the one or more sensors and the received delivery items.

In some embodiments, the one or more sensors include a plurality of distance-measuring sensors, and calculating the depth further comprises calculating the depth of the received delivery items based on an average of a plurality of distance values detected by the plurality of distance-measuring sensors, wherein the plurality of distance values correspond to distance values between a bottom of the tray and the received delivery items.

In some examples, the system includes a dispenser that is positioned above the container that deposits the delivery items into the container. In some embodiments, the dispenser includes the delivery item monitoring device. In some examples, transmitting the under-filled indicator causes the dispenser to deposit additional delivery items into the container, wherein transmitting the transport indicator causes the dispenser to cease depositing delivery items into the container, and wherein transmitting the over-filled indicator causes an alert indicating an average depth of the delivery items in the container or a maximum depth of the delivery items in the container.

In some embodiments, the delivery item monitoring device moves or the container moves, and calculating the depth further comprises calculating the depth based on a plurality of distance values detected by the one or more sensors for a plurality of locations within the container as or after the delivery item monitoring device or the container moves. In some examples, calculating the depth further comprises calculating the depth based on determining a maximum, determining a minimum, or determining a mean of the plurality of distance values. In some embodiments, generating the under-filled indicator, the transport indicator, or the over-filled indicator comprises comparing the depth of the received delivery items in the container to a predetermined threshold.

In some examples, the control system comprises a second processor to execute instructions that perform operations comprising detecting two or more indicators from two or more delivery item monitoring devices. In some embodiments, the operations also include determining that at least one indicator is incorrect. The operations can also include analyzing subsequent information to detect an identity of the delivery item monitoring device that provided at least one incorrect indicator, and generating an alert to perform maintenance on the delivery item monitoring device having the identity that was detected.

In some embodiments, the operations can include detecting vibrations from the delivery item monitoring device or a change in velocity of the delivery item monitoring device, and generating a maintenance request corresponding to the vibrations or the change in velocity of the delivery item monitoring device.

In additional embodiments, a computer-implemented method for processing delivery items can include obtaining sensor data from one or more sensors, calculating a depth of the received delivery items in the container based on the sensor data, and generating an under-filled indicator, a transport indicator, or an over-filled indicator based on the depth of the received delivery items in the container. The computer-implemented method can also include transmitting the under-filled indicator, the transport indicator, or the over-filled indicator to a control system, wherein the under-filled indicator, the transport indicator, and the over-filled indicator designate how to process the container to the control system.

In some embodiments, a non-transitory computer-readable media for processing delivery items can include instructions that in response to execution by a processor cause the processor to perform operations comprising obtaining sensor data from one or more sensors and calculating a depth of the received delivery items in the container based on the sensor data. The operations can also include generating an under-filled indicator, a transport indicator, or an over-filled indicator based on the depth of the received delivery items in the container. Additionally, the operations can include transmitting the under-filled indicator, the transport indicator, or the over-filled indicator to a control system, wherein the under-filled indicator, the transport indicator, and the over-filled indicator designate how to process the container to the control system.

Other implementations, embodiments or variations will be apparent to those of ordinary skill from reading the present disclosure.

DESCRIPTION OF DRAWINGS

The accompanying drawings, which are incorporated in and constitute a part of this specification, illustrate embodiments of the present teachings and together with the description, serve to explain the principles of the present teachings. In the drawings.

DETAILED DESCRIPTION

Reference will now be made in detail to the present examples of embodiments of the disclosure, several examples of which are illustrated in the accompanying drawings.

Various embodiments include systems, methods, devices, and manufactures that include and/or utilize devices for monitoring items, and particularly, delivery items. The delivery item monitoring devices, as generally referred to herein, can include any suitable device that detects, senses, measures, or otherwise monitors the amount, height, depth, level or the like of the items (e.g., delivery items as generally referred to herein) or goods or the like within a container. The items can be items for delivery, which can include parcels, magazines, catalogs, letters, mail pieces, and the like. As used herein, a container, such as bin, box, rigid captive tray, etc., can be any type of object that can be used to contain one or more delivery items. In some examples described herein, the container may be composed of plastic, metal, cardboard (e.g., a cardboard box), or any other suitable material. As used herein, "cardboard" can refer to any type of heavy paper or paper-like material, such as card stock, corrugated fiberboard, pasteboard, or paperboard. However, in further embodiments, the principles and features described herein can be used with containers composed of other materials, such as fabric, wood, light-weight paper, composites, etc.

As further described herein, the delivery item monitoring device can include, for example, at least one depth-sensing or distance-sensing device or sensor (e.g., a depth-judging camera, among others), electrical wires, a battery, a microcontroller, an amplifier, a display, a switch(es), a wireless transceiver, one or more additional sensing devices, (e.g., a GPS sensor, a vibration sensor), etc. In some embodiments, the delivery item monitoring device can use any number of distance-sensing devices or sensors to measure, calculate, or otherwise determine the fill height of any number of containers in a transport system. For example, consider a transport system, as in a mail sorting facility, that includes various containers that are to be filled to a predetermined target height while stationary and then transported via conveyor devices to other locations within the transport system, e.g., for sorting, loading, etc. In various embodiments, the delivery item monitoring device can move above the containers and can sense or detect the height of the items in each container when it is above each one, thus monitoring the fill height of the containers. In some embodiments, one or more dispensing devices, (e.g., devices that places delivery items (e.g., magazines, letters, etc.) into containers), and the delivery item monitoring device(s) can travel along any suitable track system, or the like, suspended above the containers to be positioned above each container. The delivery item dispensing devices can deposit delivery items into the containers below and the delivery item monitoring device can monitor the height of delivery items in each container from above. In some examples, the delivery item monitoring device can indicate when the containers are satisfactorily filled to a certain target depth or level or the like and each filled container can then be transported by a conveyor device, among other things.

Various embodiments of the delivery item monitoring device provide various technical advantages over prior delivery systems and container technologies. For example, the delivery item monitoring device enables a delivery item dispensing device to fill a container to a predetermined (e.g., satisfactory) height efficiently and via automated techniques and operation, without the need for a human operator. Additionally, in some embodiments, the delivery item monitoring device can communicate with additional devices of the delivery service to, for example, determine and transmit the number of items within a container and/or the height of the items within the container, etc.

In various implementations, the delivery item monitoring device can be used in any type of delivery system provided by any type of delivery service, such as the U.S. Postal Service (U.S.P.S.), the FedEx™ company, or the UPS™ company. Furthermore, the delivery item monitoring device can monitor and manage the delivery of items in various sorts of environments, such as mail or package sorting facilities, airports (where a piece of luggage is a delivery item), industrial facilities (where items (e.g., parts, products) that are moved, sorted, or delivered within the facility are the delivery items), and the like.

Figure 1:
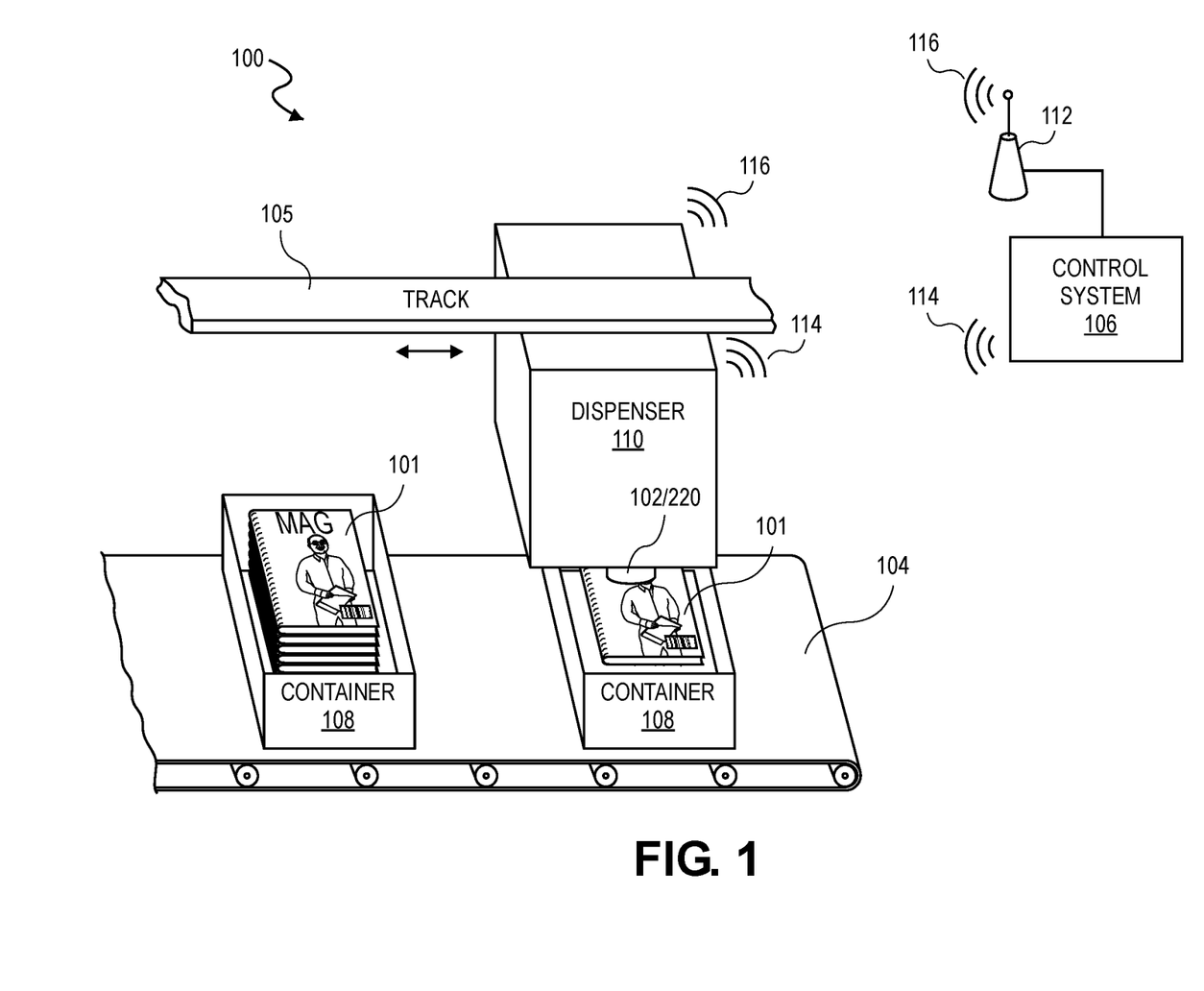
FIG. 1 is a diagram illustrating an example of a system for monitoring the filling of containers with a delivery item monitoring device, consistent with embodiments disclosed herein.

FIG. 1 is a diagram illustrating an example of a system for monitoring the filling of containers (e.g., in a mail sorting system) with a delivery item monitoring device. As shown in FIG. 1, the system 100 can include a delivery item monitoring device 102, a transport system 104, and a control system 106. The transport system 104 can include any suitable conveyor system, such as a line shaft roller conveyor, or a belt conveyor, among others. The transport system 104 can transport a container 108 to any suitable location for sensing, loading, unloading, sorting, or otherwise processing of delivery items in the container 108.

In various embodiments as shown, the system 100 also includes a dispenser device 110 that deposits delivery items into the container 108 while the container 108 is stationary; i.e., while the transport system 104 is not moving the container 108. In the example shown in FIG. 1, the dispenser device 110 can include the delivery item monitoring device 102, and it can be transported above the container 108 along an overhead track system 105, or the like. The dispenser 110 and the delivery item monitoring device 102 can be connected to a track 105 and can move in any suitable geometric shape over any number of containers 108. When the dispenser 110 travels to a position above a container 108, the dispenser 110 can deposit or place delivery items 101 into the container 108. For example, each container 108 can receive delivery items 101 corresponding to a particular location or delivery item route (e.g., items 101 that will be delivered to a particular town or ZIP code, or via a certain mail carrier route) and the dispenser 110 can be stocked with delivery items 101 for a particular container 108 according to its corresponding location or route.

The delivery item monitoring device 102 can include various components, such as a processor, a memory device, and a transceiver, such as a wireless network interface card, among others. In some embodiments, the delivery item monitoring device 102 can also include any number of sensors 220, such as a sensor that measures or detects distance and/or depth (e.g., distance-sensing cameras, laser-based range detectors, etc.), and/or a sensor that measures or detects location, position, and/or movement, (e.g., accelerometers, GPS devices, vibration sensors, and the like). In some examples, as shown, the delivery item monitoring device 102 can be moved or transported via the dispenser 110 of the system 100. For example, the delivery item monitoring device 102 can be placed or mounted onto or adjacent to the dispenser 110 or any other device that handles, sorts, or otherwise processes delivery items or goods 101. As the delivery item monitoring device 102 is positioned above various containers 108, the delivery item monitoring device 102 can measure or detect the delivery items 101 that are in each container 108 based on sensor data from its sensor(s) 220. For example, the delivery item monitoring device 102 may measure or otherwise detect the distance from the device 102 to the topmost delivery item 101 in the pile or stack of delivery items that is currently in a container 108, and this distance measurement may be used to calculate, analyze, or otherwise determine the depth (or height) of the stack or pile of delivery items in the container 108. In some examples, the delivery item monitoring device 102 can transmit the sensor data to the control system 106 for analysis. In some embodiments, the delivery item monitoring device 102 can perform local analysis based on the sensor data to reduce the amount of sensor data transmitted or otherwise provided to the control system 106.

The delivery item monitoring device 102, as depicted in FIG. 1, can be encapsulated in any suitable plastic or metal cover, such as the cover of the dispenser 110. The delivery item monitoring device 102 can include or be operably connected to a wireless transceiver (not shown in FIG. 1, but see FIG. 2, reference 201) for communicating with the control system 106. In some embodiments, the wireless transceiver may be a wireless transmitter that transmits signals 114, 116 that can be received by the control system 106. In other embodiments, the wireless transceiver may be able to transmit signals to and receive signals 114, 116 from the control system 106. In some embodiments, the delivery item monitoring device 102 can include a display (not shown) for displaying container information, such as the current item-fill depth of the container 108, etc., as described in further detail below.

In various implementations, the control system 106 can be any type of one or more computing devices. For example, the control system 106 can be a portable computing device, such as a smart phone, a tablet computer, a smart watch, any type of portable Internet-of-Things (IoT) device, etc. As a further example, the control system 106 can be a desktop computer, a server, a database system, or any type of IoT device, etc. In various implementations, the control system 106 can execute an application or program or instructions that causes the control system 106 to perform some or all of the functions described herein. In another example implementation, the control system 106 can be programmed to act as a conduit in order to retrieve information from a delivery item monitoring device 102 in a local facility or a delivery item monitoring device 102 in a remote facility.

The control system 106 can be any type of computing device(s) capable of communicating with the delivery item monitoring device 102 and/or an access point 112 via wired and/or wireless signals in one or more wired and/or wireless networks (e.g., the Internet). In some embodiments, the control system 106 can be controlled by the delivery service that operates the system 100, and the control system 106 can maintain a database of sensor data collected from multiple delivery item monitoring devices 102. The sensor data can include data indicating a current location of each of the delivery item monitoring devices 102 at a particular time, data indicating a depth of the delivery items 101 in each container 108 at a particular time, data indicating a current location of each container 108 at a particular time, data indicating the speed or movement of the delivery item monitoring devices 102, data indicating vibrations detected by the delivery item monitoring devices 102, data indicating a change in velocity of the delivery item monitoring devices 102, and/or data indicating malfunctioning components of the system 100, transport system 104, etc.

The delivery item monitoring device 102 can communicate or connect directly with the control system 106 via the wireless signal link 114. As described herein, a wireless signal can be any type of analog or digital wireless signal, such as a Bluetooth™ signal, a 3G signal, a 4G signal, a 5G signal, a radio signal, a Wi-Fi signal, and the like. In various embodiments, the delivery item monitoring device 102 can communicate with the control system 106 through a wide-area network, such as the Internet.

In some embodiments, the control system 106 and/or the delivery item monitoring device 102 can include a display (not shown), and the display can be used to display information detected by or derived from sensors within the delivery item monitoring device 102. The information can be detected by the delivery item monitoring device 102 using the features and sensors described herein.

In some implementations, the delivery item monitoring device 102 can execute software that collects and that may analyze sensor data. In some examples, the delivery item monitoring device 102 can transmit the results from the analysis of the sensor data, (and/or the sensor data itself), to the control system 106. In some implementations, to minimize bandwidth usage between the delivery item monitoring device 102 and the control system 106, the delivery item monitoring device 102 can identify a subset of the sensor data to transmit to the control system 106. In some embodiments, the delivery item monitoring device 102 can analyze, perform calculations on, or otherwise process the sensor data and send indicators or results indicating or representing the depth of the delivery items 101 in each container 108, which may be moved by the transport system 104.

In some embodiments, the delivery item monitoring device 102 can transmit sensor data and/or results from analysis of the sensor data to an access point 112, which can be any type of device(s) capable of receiving and/or sending wireless signals and communicating with the control system 106. For example, the access point 112 can be a standalone device connected to a network router in a wired network or can be a device that is integrated with a network router.

In some examples, the access point 112 can communicate with the delivery item monitoring device 102 via the wireless signal link 116 to or from the delivery item monitoring device 102. Additionally, the access point 112 can communicate with the control system 106 via wired and/or wireless signals in one or more wired and/or wireless networks (e.g., the Internet) (not shown in FIG. 1). Accordingly, the delivery item monitoring device 102 can transmit sensor data and other information related to a system 100 to the control system 106 via the wireless signal link 114 and/or the access point 112 via the wireless signal link 116.

In an example of use in the system 100, the delivery item monitoring device 102 can travel along with the dispenser 110 of the system 100 and collect sensor data about (e.g., indicating the depth of) the delivery items placed in each container 108. The sensor data can include, for example, still images of the delivery items in each container 108, videos of the delivery items in each container 108, a set of distance values indicating the distance from a sensor 220 to a topmost delivery item 101 or to the bottom of the container at various points, locations, or areas within the container 108, or the like. As noted, the distance values may be used to calculate the depth or height or fill level of the delivery items 101 at various points within the container.

In some embodiments, the delivery item monitoring device 102 can analyze the sensor data corresponding to each container 108 of the system 100 to generate or calculate an indication of the container's fill status. The delivery item monitoring device 102 can transmit an indication of an over-filled container relative to a predetermined limit, depth, height, or level, an under-filled container relative to a predetermined limit, depth, height, or level, or a container that is filled equal to a predetermined limit, depth, height, or level, optionally plus or minus a tolerance value, (for example, filled with delivery items 101 to a depth of 22 inches+/−10%, or filled with delivery items to a level that is three inches+/− one inch, below the top of the container 108, or the like). In various embodiments, the delivery item monitoring device 102 can also send sensor data corresponding to the depth, height, or level of delivery items in each container 108 to the access point 112 and/or the control system 106. The sensor data may be stored and analyzed by the control system 106 to detect malfunctioning sensors, etc. in delivery item monitoring devices 102. For example, if two different delivery item monitoring devices 102 detect different depths of the same delivery items 101 placed in a container 108, the control system 106 can determine which sensors of the delivery item monitoring devices 102 are malfunctioning. In some embodiments, the delivery item monitoring devices 102 can periodically pass by calibration sections in the transport system 104. The calibration sections can include targets with defined distances that are presented to the delivery item monitoring devices 102, which allows for continuous performance monitoring and calibration.

The system 100 is an example of a system that can be used with disclosed embodiments, and is not intended to be limiting. In various embodiments, additional devices or fewer devices and/or functions can be included in the system and the devices can communicate via one or more networks. For example, the system 100 can include multiple containers, multiple access points, multiple control systems, and other devices (e.g., databases, servers, sensors, etc.). For another example, one or more of the containers 108 may be on a stationary surface, such as the floor or a table (instead of transport system 104), while the dispenser 110 and monitoring device 102/220 operates. For yet another example, the dispenser 110 and/or the monitoring device 102/220 may be stationary (e.g., mounted from the ceiling or on a static stand) above a conveyor or other device of the transport system 104, and the transport system 104 may move and position the containers 108 under the dispenser 110 and/or the monitoring device 102/220 such that each container 108 can be filled with delivery items 101 and/or such that the amount, depth, or level of the delivery items 101 in each container can be detected, measured, or sensed by the monitoring device 102/220. In some embodiments, each container 108 can be placed on a separate conveyor device of the transport system 104. In some examples, each container 108 can be transported along a separate conveyor device of the transport system 104 when the top of the delivery items 101 deposited into each container 108 is at an acceptable depth or height. Other variations are possible within the scope of the invention.

Figure 2:
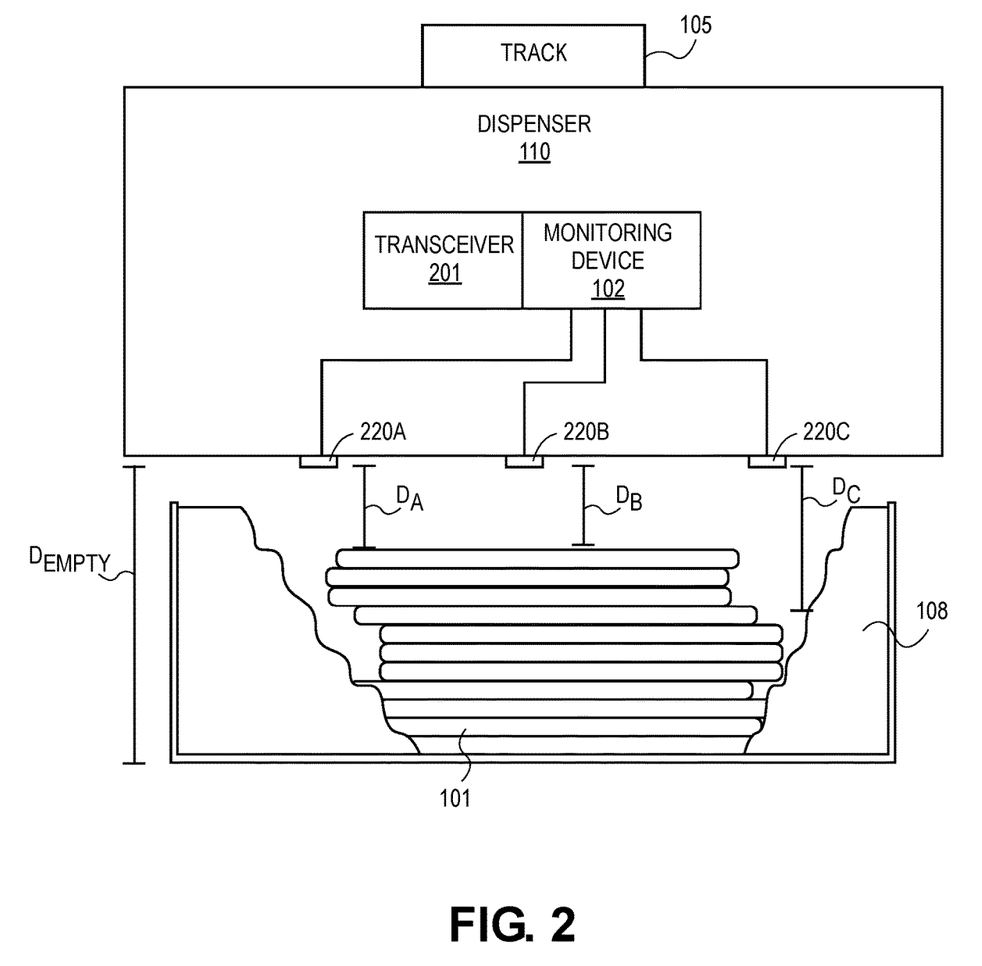
FIG. 2 is a diagram that shows a side view of the dispenser device and the tray shown in the example of FIG. 1, with the sides of the tray cut away to show the items inside.

FIG. 2 is a diagram that shows a side view of the dispenser device 110 and a container 108 as shown in the example of FIG. 1, with the sides of the container 108 cut away to show the items 101 inside. In some embodiments, the dispenser device 110 can be coupled to an overhead track 105, which enables the dispenser device 110 to be moved over the top of any number of trays 108. In some examples, the monitoring device 102 resides within the dispenser device 110. For example, the monitoring device 102 can be incorporated into the dispenser device 110 or the monitoring device 102 can be a separate device that is placed into the dispenser device 110.

As discussed above in relation to FIG. 1, the container 108 can receive any number of delivery items 101 from any number of dispenser devices 110. In some embodiments, the delivery items 101 can be deposited into the container 108 at any suitable angle. For example, the delivery items 101 can rotate at any angle along a horizontal plane, and/or a vertical plane as the delivery items 101 are released from the dispenser device 110. For example, delivery items 101 can rotate so that the delivery items 101 are deposited vertically into the container 108 or horizontally into the container 108. As shown in FIG. 2, the delivery items 101 are deposited into the container 108, in one example, in the same horizontal manner. However, the delivery items 101 of FIG. 2 are stacked in an uneven manner, in which the edges of the delivery items 101 are not in alignment.

In some embodiments, the monitoring device 102 can be electronically coupled to any number of sensors 220A, 220B, and 220C, among others. In some examples, the sensors 220A, 220B, and 220C can reside within the dispenser device 110 or within the monitoring device 102. The sensors 220A, 220B, and 220C can detect a distance between each of the sensors 220A, 220B, and 220C and a top of the delivery items 101 in the container 108. For example, the sensors 220A can detect a distance, Da, between the sensor 220A and a top of the delivery items 101 below the sensor 220A in the container 108. In some examples, sensors 220B and 220C can also detect distances, Db and Dc, respectively, between the sensors 220B and 220C and a top of the delivery items 101 below the sensors 220B and 220C.

In some embodiments, the monitoring device 102 can detect a depth of the delivery items 101 in the container 108 based on a comparison of the distances captured by the sensors 220A, 220B, and 220C to a bottom of the container 108. For example, $D_{empty}$ can indicate a distance from a bottom of the container 108 to the sensors 220A, 220B, and 220C or a top edge of the container 108. In some examples, $D_{empty}$ is detected from the sensors 220A, 220B, and 220C based on an empty container 108. In some embodiments, $D_{empty}$ is a predetermined static distance, or $D_{empty}$ can be excluded from a calculation of the distance of the top of the delivery items 101 in a container 108 to the sensors 220A, 220B, and 220C. In some embodiments, the monitoring device 102 can implement any suitable calculation to detect if additional delivery items 101 can be placed in the container 108, if the container 108 is ready to be transported, or if the container 108 has been overfilled and delivery items 101 are to be removed from the container 108. In some embodiments, the monitoring device 102 can communicate a depth of the delivery items 101 in the container 108 or a distance between the sensors 220A, 220B, and 220C and the top of the delivery items 101 to any suitable control device or remote devices via the transceiver 201.

It is to be understood that FIG. 2 is an example of a system that can be used with various disclosed embodiments, and is not intended to be limiting. In various embodiments, additional devices or fewer devices and/or functions can be included in the system and the devices can communicate via one or more networks.

Figure 3:
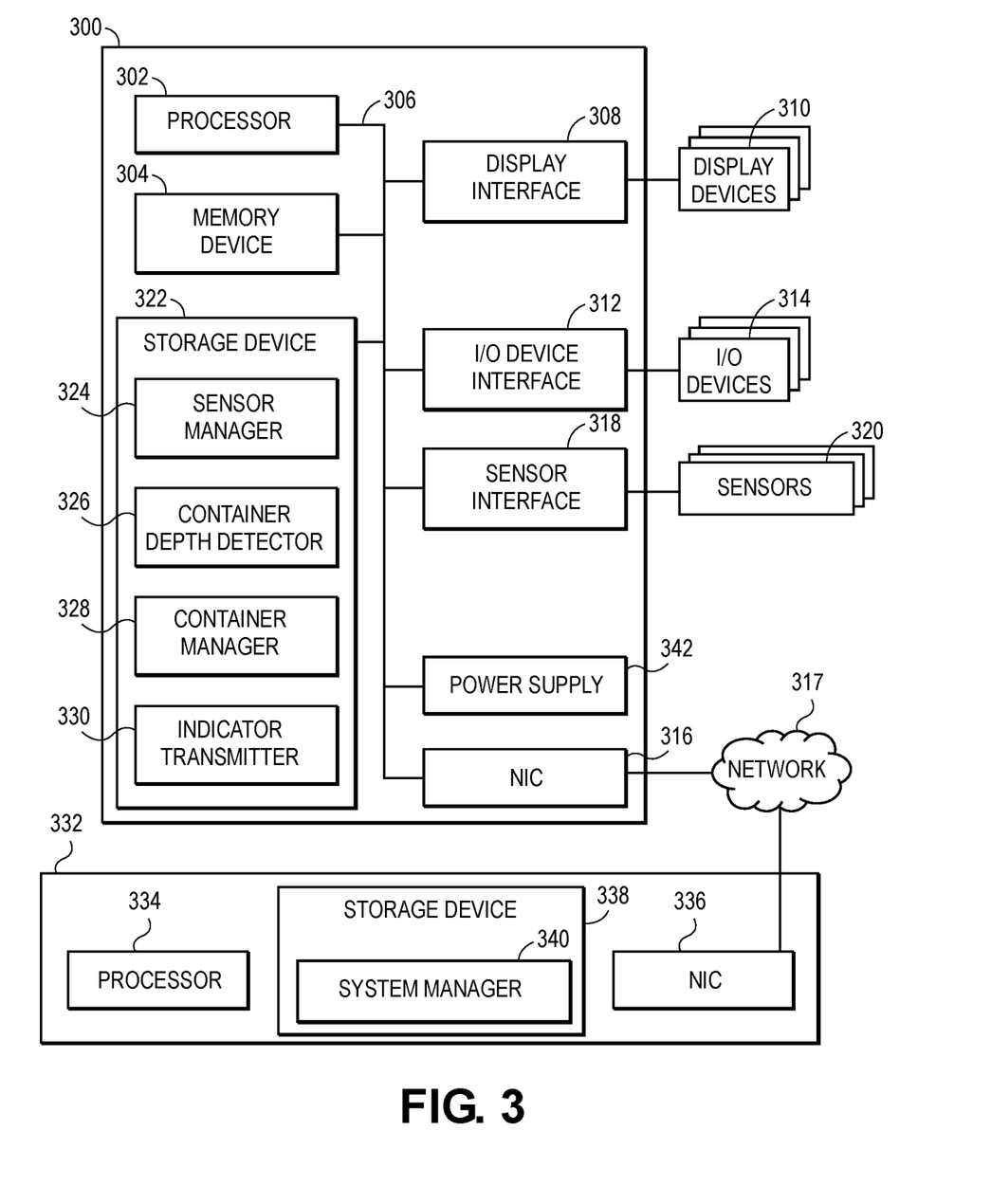
FIG. 3 is a diagram illustrating a block diagram of an example delivery item monitoring device and a control system, consistent with embodiments disclosed herein.

FIG. 3 is a diagram illustrating an example of a delivery item monitoring device and a control system, consistent with embodiments described herein. As discussed in greater detail below, the delivery item monitoring device 300 can collect and process data corresponding to transport systems (not depicted). In some embodiments, the delivery item monitoring device 300 can include a processor 302 that is configured to execute stored instructions, as well as a memory device 304 that stores instructions that are executable by the processor 302. The processor 302 can be a single core processor, or a multi-core processor, among others. The memory device 304 can include random access memory, read only memory, flash memory, or any other memory system. The instructions that are executed by the processor 302 can implement the method 400 that collects and processes sensor data related to transport systems as described below in relation to FIGS. 4 and 5.

The processor 302 can also be linked through a system interconnect 306 (e.g. PCI®, PCI-Express®, etc.) to a display interface 308 configured to connect the delivery item monitoring device 300 to a display device 310. The display device 310 can include a built-in display screen or an externally connected display screen such as a computer monitor, television, and the like.

Additionally, the processor 302 can be connected through the system interconnect 306 to an input/output (I/O) device interface 312 configured to connect the delivery item monitoring device 300 to one or more I/O devices 314. The I/O devices 314 can include, for example, a keyboard, a mouse, a touchpad, and the like. The I/O devices 314 can be built-in components of the delivery item monitoring device 300 or the I/O devices 314 can be externally connected to the delivery item monitoring device 300.

In some embodiments, the processor 302 can be linked through the system interconnect 306 to a network interface controller (also referred to as a "NIC") 316 that is configured to connect the delivery item monitoring device 300 through the NIC 316 to a network 317. The network 317 may be a cellular network, a radio network, a wide area network (WAN), a local area network (LAN), or the Internet, among others.

In some embodiments, the processor 302 can also be linked through the system interconnect 306 to a sensor interface 318 that connects to any number of sensors 320. The sensors 320 can include a speed sensor, a distance sensor, a tilt sensor, an acceleration sensor, a temperature sensor, a humidity sensor, a vibration sensor, a location sensor, a sound sensor, and the like. In some embodiments, the sensors 320 can also include a digital camera, and a microphone.

In some embodiments, the delivery item monitoring device 300 can have a modular design that enables changing the sensors 320 coupled to the delivery item monitoring device 300. For example, the modular design can enable any number of sensors 320 to attach to an external portion of the delivery item monitoring device 300. The sensors 320 can share a common interface, such as a universal serial bus (USB) interface, among others. The common interface can enable changing the sensors 320 coupled to the delivery item monitoring device 300. For example, the common interface can enable replacing an accelerometer with another sensor, such as a compass or an indoor positioning system sensor, among others.

In some embodiments, the processor 302 can also be linked through the system interconnect 306 to a storage device 322 that can include a hard drive, an optical drive, a USB flash drive, a solid state drive, or any combination thereof. In some examples, the storage device 322 can include any suitable number of applications and stored data that enable the delivery item monitoring device 300 to collect and process sensor data related to transport systems. For example, the storage device 322 can include a sensor manager 324, a container depth detector 326, a container manager 328, and an indicator transmitter 330. The sensor manager 324 can detect sensor data from any number of sensors 320. In some examples, the sensor manager 324 can detect sensor data from one or more sensors of the delivery item monitoring device 300. For example, the sensor data can be collected from the delivery item monitoring device 300 in motion over a container receiving delivery items. The sensor data can include images, videos, and depth values corresponding to delivery items stored in each container. In some examples, the sensor data can be transmitted along with a container identifier associated with the sensor data. In some embodiments, the container depth detector 326 can calculate a depth of the received delivery items in the container based on the sensor data. Embodiments for calculating the depth of the delivery items are described in greater detail below in relation to FIG. 4. In some examples, the container manager 328 can generate an under-filled indicator, a transport indicator, or an over-filled indicator based on the depth of the delivery items in the container.

In some embodiments, the indicator transmitter 330 can transmit an under-filled indicator, a transport indicator, or an over-filled indicator to a control system 332 of the transport system via the NIC 316 and the network 317. The control system 332 can manage or designate how to process the transportation of containers through the transport system based on the under-filled indicator, the transport indicator, and the over-filled indicator. In some embodiments, the under-filled indicator results in additional delivery items being deposited into the container prior to the container being transported through the transport system, the transport indicator results in the container being transported through the transport system, and the over-filled indicator results in generating an alert indicating an average or a maximum fill height of the delivery items in the container.

In some embodiments, the control system 332 can be any suitable server, desktop computer, laptop computer, tablet device, Raspberry Pi, and the like. The control system 332 can also include a processor 334, a NIC 336, and a storage device 338, among other components. In some embodiments, the storage device 338 can include a system manager 340 that can detect the indicators from one or more delivery item monitoring devices 300. The system manager 340 can also determine that at least one indicator is inaccurate. For example, the control system 332 can determine that conflicting indicators have been received for a container, wherein the conflicting indicators are provided by multiple delivery item monitoring devices 300. For example, a first delivery item monitoring device can indicate that a container is under-filled with delivery items, while a second delivery item monitoring device can indicate that the container is over-filled with delivery items.

In some embodiments, the system manager 340 can also analyze subsequent information to detect an identity of the delivery item monitoring device 300 that provided an incorrect indicator. For example, the system manager 340 can collect images of the container, sensor data from one or more delivery item monitoring devices 300, and the like. The system manager 340 can use machine learning techniques to analyze images to determine if delivery items are filled above a top edge of a container. In some examples, the system manager 340 can generate a user interface that includes an image of a container corresponding to conflicting indicators.

In some embodiments, the system manager 340 can also generate an alert to perform maintenance on at least one of the sensors 320 of the delivery item monitoring device 300 that provided an incorrect indicator. In some embodiments, the alert can be transmitted to a remote device (not depicted) or any suitable user via an email, a text message, or any other digital communication.

Returning to the delivery item monitoring device 300, in some embodiments, the delivery item monitoring device 300 can also include a power supply 342. The power supply 342 can receive power for the delivery item monitoring device 300 from any suitable source using a dynamo charge, a flash charge, an inductive charge, or a plug-in charging station, among others.

It is to be understood that the block diagram of FIG. 3 is not intended to indicate that the delivery item monitoring device 300 or the control system 332 are to include all of the components show in FIG. 3. Rather, the delivery item monitoring device 300 and the control system 332 can include fewer or additional components not illustrated in FIG. 3. For example, the delivery item monitoring device 300 can be included within a dispenser that is positioned above a container, wherein the dispenser deposits delivery items into the container. Additionally, the sensor manager 324, container depth detector 326, container manager 328, and indicator transmitter 330 can be partially, or entirely, implemented in hardware and/or in the processor 302. In some examples, the functionalities of the sensor manager 324, the container depth detector 326, the container manager 328, and the indicator transmitter 330 can be implemented with logic that can include any suitable hardware, software, firmware, or any combination of hardware, software, and firmware. Moreover, the functionalities of the system manager 340 can also be implemented with logic that can include any suitable hardware (e.g. processor 332), software, firmware, or any combination of hardware, software, and firmware.

Figure 4:
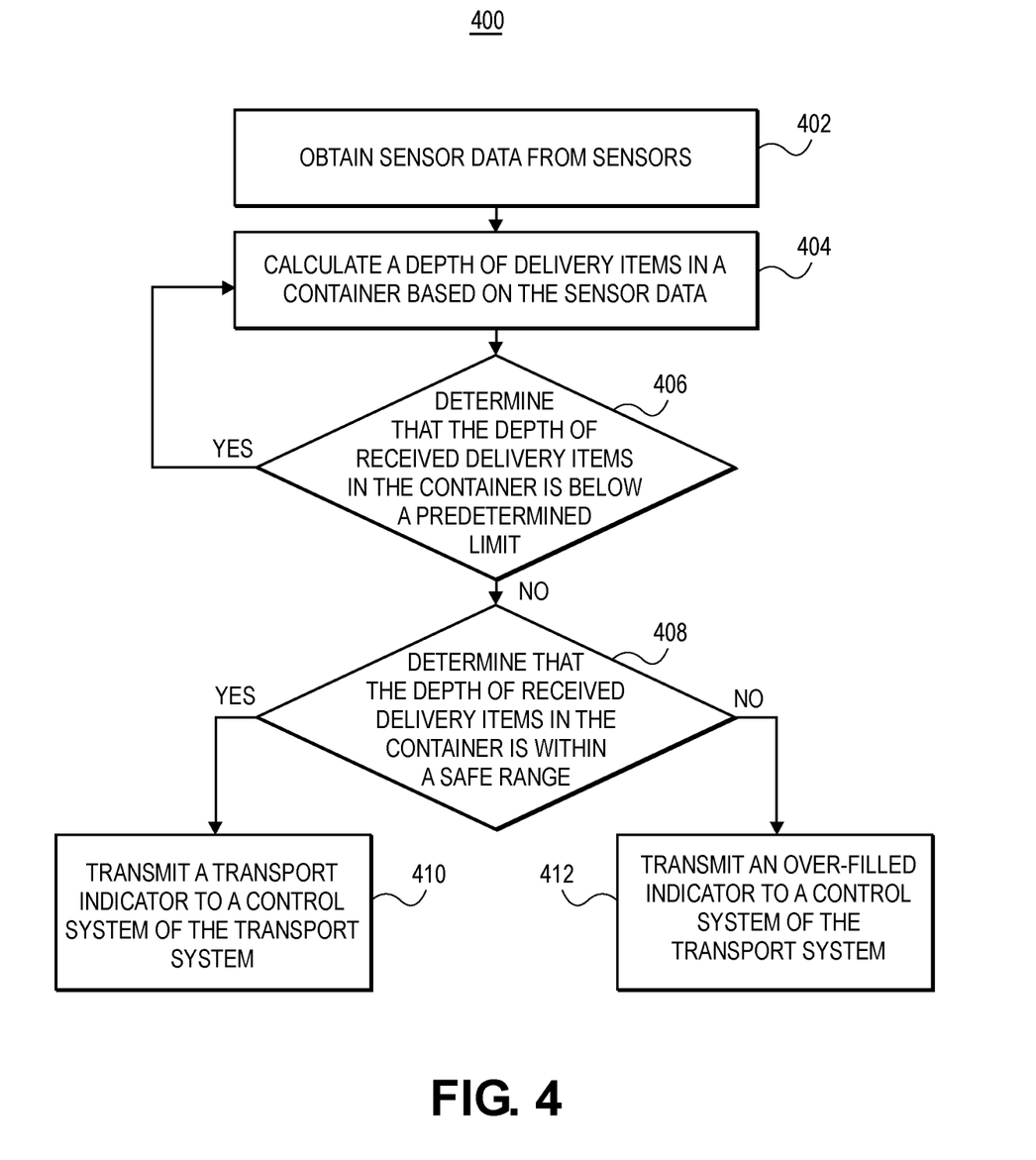
FIG. 4 is an example of a process flow diagram for a delivery item monitoring device processing sensor data, consistent with embodiments disclosed herein.

FIG. 4 is a process flow diagram of an example method for monitoring a container in a transport system with a delivery item monitoring device. The method 400 can be implemented with any suitable device, such as the delivery item monitoring device 102 of FIG. 1, or delivery item monitoring device 300 of FIG. 3, among others.

At block 402, a delivery item monitoring device can obtain or detect sensor data from one or more sensors of the delivery item monitoring device. The sensors can include any suitable distance-measuring sensor such as a camera (e.g., a stereo depth camera), a laser range finder, an infrared range finder, an ultrasonic range finder, or a combination thereof. In some embodiments, the sensors can also include an accelerometer, a location sensor, or a combination thereof. In some examples, the sensor data is collected from the delivery item monitoring device in motion over a container receiving delivery items. In some embodiments, the delivery item monitoring device can travel at any suitable speed along a delivery or conveyor device that is above the container. The delivery item monitoring device can be adjacent to delivery item filling devices that deposit delivery items into the container. In some examples, the delivery item monitoring device can travel along any geometric path, such as a circular path, an oval path, a square path, a rectangular path, and the like. The delivery item monitoring device can travel over a container with a predetermined frequency such as once per minute, or any other suitable frequency. In some examples, the delivery item monitoring device can detect a number of depth values for each sensor as the delivery item monitoring device passes above the container. The depth values are calculated based on techniques described below in relation to block 404. For example, each sensor of the delivery item monitoring device can detect one, five, ten, or any other suitable number of depth readings. The number of depth readings detected by the delivery item monitoring device can be adjusted based on the speed of the delivery item monitoring device. For example, increasing the speed at which the delivery item monitoring device travels along the delivery device can reduce the number of depth readings detected by each sensor. In some embodiments, reducing the speed at which the delivery item monitoring device travels along the delivery device can increase the number of depth readings detected by each sensor.

At block 404, the delivery item monitoring device can calculate a depth of the received delivery items in the container based on the sensor data. As discussed above in relation to FIG. 2, the depth of delivery items can be based on a distance measured from the sensors to a bottom of an empty container, a distance from the sensors to a top of delivery items in the container, or a combination thereof. For example, the depth can be calculated based on a distance from the sensors to a bottom of the container minus a distance from the sensors to a top of the delivery items. The distance from the sensors to the bottom of the container can be a predetermined static distance or a distance detected by the sensors when the container is empty.

In some embodiments, the depth of the delivery items can be calculated based on any number of distance values or depth values from each sensor to a top of the delivery items in a container. For example, calculating the depth of the delivery items can include calculating the depth of the received delivery items based on an average of distance values detected by the sensors, wherein the distance values correspond to distance values between the sensors and a top of the received delivery items. In some examples, calculating the depth of the delivery items in a container can include calculating the depth of the received delivery items based on an average of distance values detected by sensors, wherein the distance values correspond to distance values between a bottom of the tray and a top of the received delivery items.

In some embodiments, the depth values or distance values from each sensor can be applied to a maximum function, a minimum function, an average function, a mean function, and the like. For example, the depth of the delivery items can be represented as a vector in which each value of the vector corresponds to an average depth at a different location within the container. In some embodiments, multiple sensors can take multiple measurements as the sensors pass over a container. The sensor data can be used to create a three-dimensional representation that indicates the height levels of the content or delivery items in a container. In some examples, the sensor data can be used to describe the stack quality of the delivery items in the container. The stack quality can indicate an even or uneven stack of delivery items in a container. For example, the sensor data can indicate if smaller items can still be placed into the container once filling limits are close to being reached.

At block 406, the delivery item monitoring device can determine whether the depth of the received delivery items is below a predetermined threshold or limit for the container. The predetermined limit for the container can correspond to an average height limit of delivery items in the container, a maximum height limit of delivery items in the container, a mean height limit of delivery items in the container, and the like. For example, the predetermined limit can indicate that an average height of the top of the delivery items in a container is to be below a particular distance from the top of the container. In some embodiments, the average height limit can be half of one inch, one inch, two centimeters, or any other suitable distance from the top of the container. In some examples, the delivery item monitoring device can use a maximum height limit in response to detecting delivery items of particular shapes or sizes. For example, delivery items with shapes that result in a large horizontal displacement within the container can cause the delivery item monitoring device to use a maximum height limit when measuring the fill height of a container.

If the delivery item monitoring device determines that the depth of the received delivery items is below a predetermined distance limit or threshold, the process can return to block 404 and continue calculating the depth of delivery items placed in a container. In some embodiments, the delivery item monitoring device can also generate and transmit an under-filled indicator to a control system of the transport system, wherein the under-filled indicator results in additional delivery items being deposited into the container by a dispenser prior to the container being transported through the transport system. In some examples, the delivery item monitoring device can transport the container in response to detecting a height of the delivery items in the container is within a distance below the predetermined limit for the container. For example, the delivery item monitoring device can transport the delivery items in the container when the height of the delivery items is within one inch, two centimeters, or any other suitable distance, from the predetermined limit of the container.

At block 408, the delivery item monitoring device can determine if the depth of received delivery items in a container is within a safe range. For example, the delivery item monitoring device can detect that the height of the delivery items in the container is within a safe range for transporting the container through the transport system. For example, the safe range can be any suitable distance, such as one inch, or two centimeters, among others, above the predetermined limit of the container. If the delivery item monitoring device determines that the depth of the received delivery items in a container is within the safe range, the processor continues at block 410. At block 410, the delivery item monitoring device can generate and transmit a transport indicator to a control system of the transport system, wherein the transport indicator results in a dispenser ceasing the deposit of additional delivery items into the container and the container being transported through the transport system.

If the delivery item monitoring device determines that the depth of the received delivery items in a container is not within the safe range, the process continues at block 412. At block 412, the delivery item monitoring device can generate and transmit an over-filled indicator that results in the container being routed to an over-filled container section of the transport system. In some examples, the over-filled indicator corresponds to a height of the delivery items exceeding the safe range above the predetermined limit. In some embodiments, the delivery item monitoring device can generate an alert that is transmitted to a remote device or control system in response to detecting the height of the delivery items in the container exceeds the safe range above the predetermined limit. The alert can include an average or a maximum fill height or depth of the delivery items in the container and request that one or more delivery items be removed from the container before the container is transported through the transport system.

It is to be understood that the process flow of FIG. 4 can include any number of additional blocks or any number of fewer blocks. Furthermore, the blocks of FIG. 4 can be performed in any suitable order.

Figure 5:
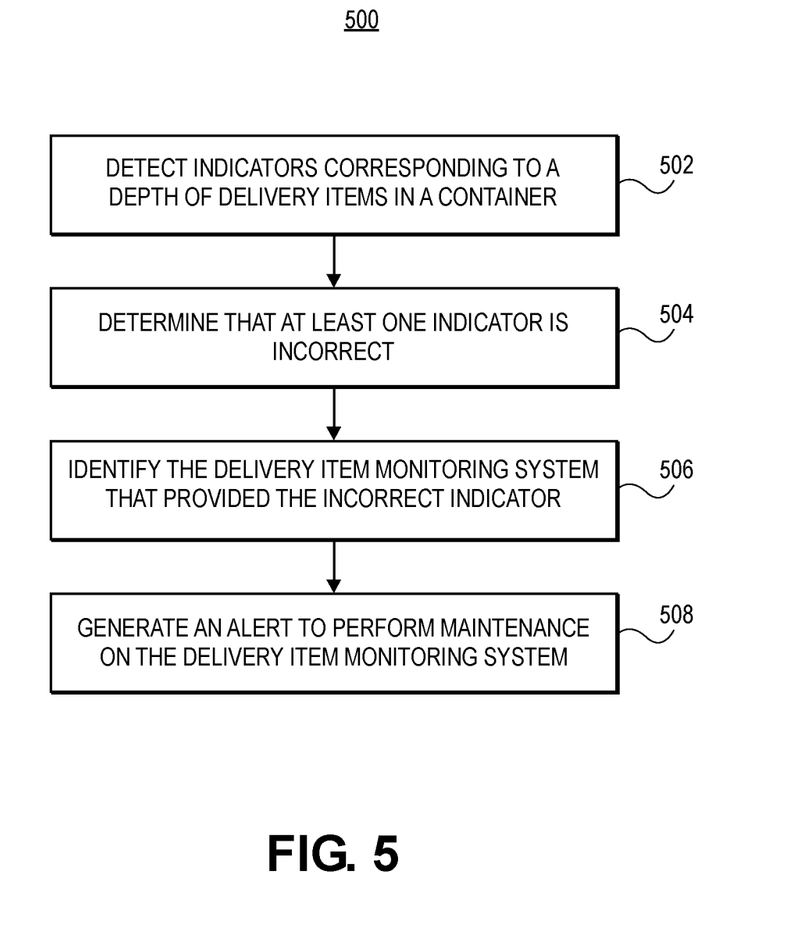
FIG. 5 is an example of a process flow diagram for a control system analyzing collected sensor data from one or more delivery item monitoring devices, consistent with embodiments disclosed herein.

FIG. 5 is a process flow diagram of an example method for monitoring a container in a transport system with a control system. The method 500 can be implemented with any suitable device, such as the control system 106 of FIG. 1 or control system 332 of FIG. 3, among others.

At block 502, the control system can detect or connect to indicators from one or more delivery item monitoring devices. For example, the control system can detect indicators that provide a fill depth of delivery items in any number of containers of a transport system. In some examples, the indicators can identify containers that are under-filled, containers filled within a safe range of a predetermined limit, and containers that are over-filled with delivery items exceeding the safe range of the containers. In some examples, the control system can also receive sensor data indicating a predetermined set of depth values from various locations within each container.

At block 504, the control system can determine that at least one indicator is incorrect. For example, the control system can determine that conflicting indicators have been received for a container, wherein the conflicting indicators are provided by multiple delivery item monitoring devices. In some embodiments, a first delivery item monitoring device can indicate that a container is under-filled with delivery items, while a second delivery item monitoring device can indicate that the container is over-filled with delivery items. The control system can detect that a malfunctioning sensor is located in either the first delivery item monitoring device or the second delivery item monitoring device.

At block 506, the control system can analyze subsequent information to detect an identity of the delivery item monitoring device that provided an incorrect indicator. For example, the control system can collect subsequent information that includes images of the container, videos of the container, sensor data from one or more delivery item monitoring devices, and the like. In some embodiments, the control system can use machine learning techniques to analyze images to determine if delivery items are filled above a top edge or safe range of a container. In some examples, the control system can generate a user interface that includes an image of a container corresponding to conflicting indicators. In some embodiments, the control system can detect the delivery item monitoring device that provided an inaccurate or incorrect over-filled indicator based on the analysis of the images, videos, and sensor data of the container.

In some embodiments, the properties of the delivery items (for example, a very reflective surface) might cause measurement inaccuracies. In those cases, an image or video processed using a machine learning technique can detect a reflective surface of a delivery item and adjust an estimated height of the delivery item within a container. In some examples, the method can include presenting images or videos of suspected inaccurate measurement data or sensor data to a user. As discussed above, each delivery item monitoring device can periodically pass by defined calibration sections in the transport system. The calibration sections can include targets with defined distances that are presented to the delivery item monitoring device allowing for continuous calibration of the delivery item monitoring device.

At block 508, the control system can generate an alert to perform maintenance on at least one of the sensors of the delivery item monitoring device that provided an incorrect indicator. In some examples, the alert can be transmitted to a remote device or any suitable user via an email, a text message, or any other digital communication. In some examples, the control system can also halt the delivery item monitoring devices and the corresponding delivery device transporting the delivery item monitoring devices.

It is to be understood that the process flow of FIG. 5 can include any number of additional blocks or any number of fewer blocks. Furthermore, the blocks of FIG. 5 can be performed in any suitable order. In some examples, the control system can also detect vibrations detected by the delivery item monitoring devices or a change in velocity of the delivery item monitoring devices. The vibrations or change in velocity of the delivery item monitoring devices can indicate maintenance issues within the delivery device transporting the delivery item monitoring devices above the containers. In some embodiments, the control system can generate a maintenance request corresponding to a maintenance issue and transmit the maintenance request to any suitable device or user via an electronic communication. In some examples, the control system can also halt the conveyor device and stop the delivery item monitoring devices from being transported above the containers until a maintenance issue is corrected.

Figure 6:
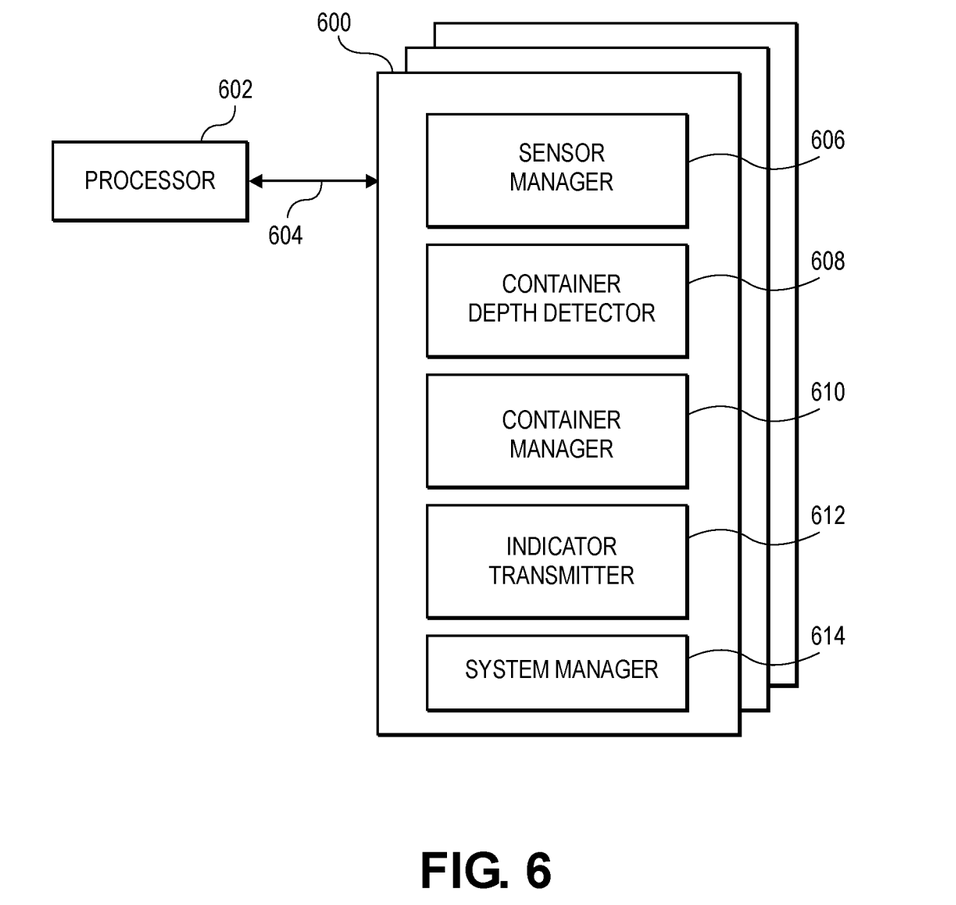
FIG. 6 is an example of a tangible, non-transitory, computer-readable medium for monitoring a transport system with a delivery item monitoring device, consistent with embodiments described herein.

FIG. 6 illustrates a block diagram of a non-transitory computer-readable medium for monitoring containers of a transport system. The tangible, non-transitory computer-readable medium 600 can be accessed by a processor 602 over any suitable system interconnect or system interface 604. Furthermore, the tangible, non-transitory computer-readable medium 600 can include code that directs the processor 602 to perform the operations of the various embodiments described above in relation to FIGS. 1-5.

The software components described above can be stored on the tangible, non-transitory computer-readable medium 600, as indicated in FIG. 6. In some embodiments, the tangible, non-transitory computer-readable medium 600 can include a sensor manager 606 that can detect sensor data from one or more sensors of a delivery item monitoring device. For example, the sensor data can be collected from the delivery item monitoring device in motion over a container receiving delivery items. In some embodiments, the tangible, non-transitory computer-readable medium 600 can also include a container depth detector 608 that can calculate a depth of the received delivery items in the container based on the sensor data. In some examples, a container manager 610 can generate an under-filled indicator, a transport indicator, or an over-filled indicator based on the depth of the delivery items in the container. In some embodiments, the tangible, non-transitory computer-readable medium 600 can further include an indicator transmitter 612 that can transmit the under-filled indicator, the transport indicator, or the over-filled indicator to a control system of the transport system, wherein the control system manages transportation of the container through the transport system based on the under-filled indicator, the transport indicator, or the over-filled indicator.

In some embodiments, the tangible, non-transitory computer-readable medium 600 can also include a system manager 614 that can detect the indicators from one or more delivery item monitoring devices. The system manager 614 can also determine that at least one indicator is inaccurate. For example, the system manager 614 can determine that conflicting indicators have been received for a container, wherein the conflicting indicators are provided by multiple delivery item monitoring devices. The system manager 614 can analyze subsequent information to detect an identity of the delivery item monitoring device that provided an incorrect indicator. In some examples, the system manager 614 can generate a user interface that includes an image of a container corresponding to conflicting indicators.

It is to be understood that any suitable number of software components shown in FIG. 6 can be included within the tangible, non-transitory computer-readable medium 600. For example, the tangible, non-transitory computer-readable medium 600 can include an additional or a fewer number of software components.

While the teachings have been described with reference to the examples of embodiments, those skilled in the art will be able to make various modifications to the described embodiments without departing from the true spirit and scope. The terms and descriptions used herein are set forth by way of illustration only and are not meant as limitations. In particular, although the method has been described in a specific order of steps, the steps of the method may be performed in a different order than illustrated, or may be performed simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system for processing delivery items, the system comprising:
    a delivery item monitoring device comprising one or more sensor, wherein the delivery item monitoring device is positioned above a container that is receiving delivery items and the one or more sensor detects a distance between the one or more sensor and at least one of the delivery items;
    a control system; and
    a processor that is communicatively connected to the delivery item monitoring device and that is configured to execute computer-readable instructions that cause the processor to perform operations comprising:
        obtaining sensor data from the one or more sensor;
        calculating a depth of the received delivery items in the container based on the sensor data;
        generating an under-filled indicator, a transport indicator, or an over-filled indicator based on the depth of the received delivery items in the container; and
        transmitting the under-filled indicator, the transport indicator, or the over-filled indicator to the control system, wherein the under-filled indicator, the transport indicator, and the over-filled indicator designate how to process the container to the control system; and
    wherein the control system comprises a second processor that is configured to execute instructions that cause the second processor to perform operations comprising:
        detecting two or more indicators from two or more delivery item monitoring devices;
        determining that at least one indicator is incorrect;
        analyzing information to detect an identity of the delivery item monitoring device that provided the at least one incorrect indicator; and
        generating an alert to perform maintenance on the delivery item monitoring device having the identity that was detected.

2. The system of claim 1, wherein the one or more sensor comprises one or more distance-measuring sensor.

3. The system of claim 2, wherein the one or more distance-measuring sensor comprises one or more of: a camera, a laser range finder, an infrared range finder, an ultrasonic range finder, or a combination thereof.

4. The system of claim 2, wherein the one or more sensor further comprises an accelerometer, a location sensor, or a combination thereof.

5. The system of claim 1, wherein the one or more sensor comprises a plurality of distance-measuring sensors; and
    wherein calculating the depth further comprises calculating the depth of the received delivery items based on an average of a plurality of distance values detected by the plurality of distance-measuring sensors, the plurality of distance values corresponding to distance values between each of the one or more sensor and the received delivery items.

6. The system of claim 1, wherein the one or more sensor comprises a plurality of distance-measuring sensors; and
    wherein calculating the depth further comprises calculating the depth of the received delivery items based on an average of a plurality of distance values detected by the plurality of distance-measuring sensors, the plurality of distance values corresponding to distance values between a bottom of the container and one or more tops of the received delivery items.

7. The system of claim 1, further comprising a dispenser that is positioned above the container and that deposits the delivery items into the container.

8. The system of claim 7, wherein the dispenser includes the delivery item monitoring device.

9. The system of claim 7, wherein transmitting the under-filled indicator causes the dispenser to deposit additional delivery items into the container;
    wherein transmitting the transport indicator causes the dispenser to cease depositing delivery items into the container; and
    wherein transmitting the over-filled indicator causes an alert indicating an average depth of the delivery items in the container or a maximum depth of the delivery items in the container.

10. The system of claim 1, wherein the delivery item monitoring device moves or the container moves; and
    wherein calculating the depth further comprises calculating the depth based on a plurality of distance values detected by the one or more sensor for a plurality of locations within the container after the delivery item monitoring device or the container moves.

11. The system of claim 10, wherein calculating the depth further comprises calculating the depth based on one or more of: determining a maximum, determining a minimum, or determining a mean of the plurality of distance values.

12. The system of claim 10, wherein generating the under-filled indicator, the transport indicator, or the over-filled indicator comprises comparing the depth of the received delivery items in the container to a predetermined threshold.

13. The system of claim 1, wherein the second processor further performs operations comprising:
    detecting vibrations from the delivery item monitoring device or a change in velocity of the delivery item monitoring device; and
    generating a maintenance request corresponding to the vibrations or the change in velocity of the delivery item monitoring device.

14. A computer-implemented method for processing delivery items comprising:
- obtaining sensor data from one or more sensor;
- calculating a depth of received delivery items in a container based on the sensor data;
- generating an under-filled indicator, a transport indicator, or an over-filled indicator based on the depth of the received delivery items in the container;
- transmitting the under-filled indicator, the transport indicator, or the over-filled indicator to a control system, wherein the under-filled indicator, the transport indicator, and the over-filled indicator designate how to process the container to the control system;
- detecting two or more indicators from two or more delivery item monitoring devices;
- determining that at least one indicator is incorrect;
- analyzing information to detect an identity of the delivery item monitoring device that provided the at least one incorrect indicator; and
- generating an alert to perform maintenance on the delivery item monitoring device having the identity that was detected.

15. The computer-implemented method of claim 14, wherein the one or more sensor comprises one or more distance-measuring sensor.

16. A non-transitory computer-readable media for processing delivery items comprising instructions that in response to execution by a processor cause the processor to perform operations comprising:
- obtaining sensor data from one or more sensor;
- calculating a depth of received delivery items in a container based on the sensor data;
- generating an under-filled indicator, a transport indicator, or an over-filled indicator based on the depth of the received delivery items in the container; and
- transmitting the under-filled indicator, the transport indicator, or the over-filled indicator to a control system, wherein the under-filled indicator, the transport indicator, and the over-filled indicator designate how to process the container to the control system;
- detecting two or more indicators from two or more delivery item monitoring devices;
- determining that at least one indicator is incorrect;
- analyzing information to detect an identity of the delivery item monitoring device that provided the at least one incorrect indicator; and
- generating an alert to perform maintenance on the delivery item monitoring device having the identity that was detected.

17. The non-transitory computer-readable media of claim 16, wherein the one or more sensor comprises one or more of: a camera, a laser range finder, an infrared range finder, an ultrasonic range finder, or a combination thereof.

18. The non-transitory computer-readable media of claim 16, wherein the one or more sensor comprises a plurality of sensors, and
- wherein calculating the depth further comprises calculating the depth of the received delivery items based on an average of a plurality of distance values detected by the plurality of sensors, the plurality of distance values corresponding to distance values between each the one or more sensor and the received delivery items.

19. The non-transitory computer-readable media of claim 16, wherein the one or more sensor comprises a plurality of distance-measuring sensors; and
- wherein calculating the depth further comprises calculating the depth of the received delivery items based on an average of a plurality of distance values detected by the plurality of distance-measuring sensors, the plurality of distance values corresponding to distance values between a bottom of the container and one or more top of the received delivery items.

20. The computer-implemented method of claim 14, wherein the one or more sensor comprises a plurality of distance-measuring sensors; and
- wherein calculating the depth further comprises calculating the depth of the received delivery items based on a plurality of distance values detected by the plurality of distance-measuring sensors, the plurality of distance values corresponding to distance values between each of the one or more sensor and the received delivery items.

* * * * *